May 19, 1970 — C. L. TANNER — 3,512,789
CRYOGENIC FACE SEAL
Filed March 31, 1967
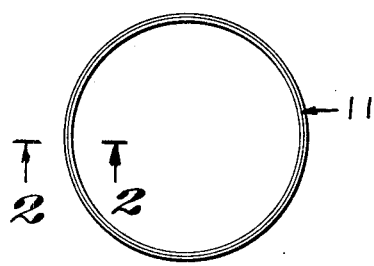
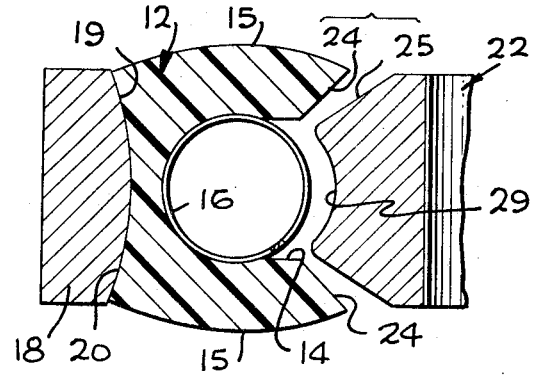
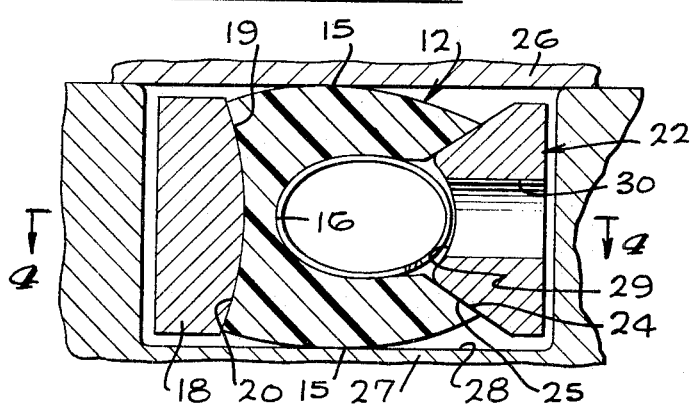
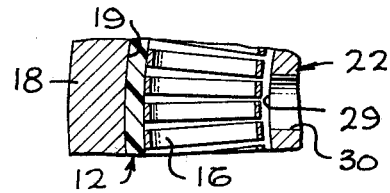
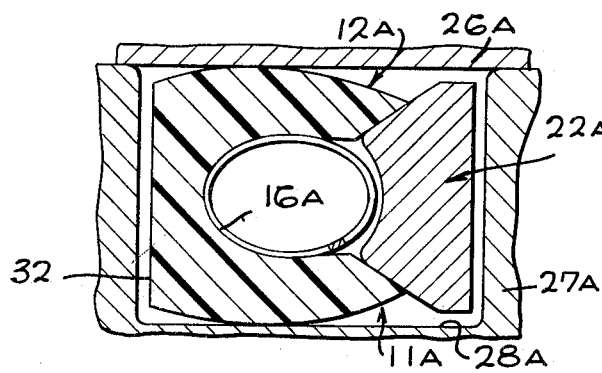
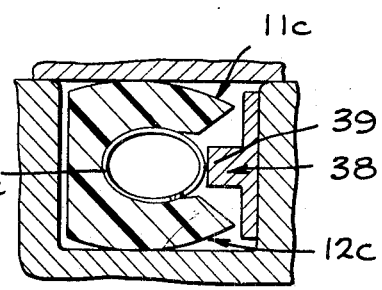
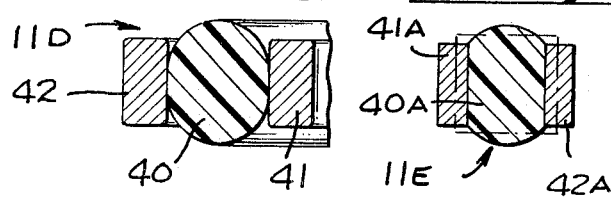
INVENTOR.
CHARLES L. TANNER
BY
Mason & Graham
ATTORNEYS

United States Patent Office 3,512,789
Patented May 19, 1970

3,512,789
CRYOGENIC FACE SEAL
Charles L. Tanner, 1641 Bedford St.,
Los Angeles, Calif. 90035
Filed Mar. 31, 1967, Ser. No. 627,560
Int. Cl. F02f 5/00; F16j 15/00, 15/40
U.S. Cl. 277—26                             3 Claims

ABSTRACT OF THE DISCLOSURE

The application discloses a multiring seal ring made up of a sealing ring and one or more other rings having a different coefficient of expansion from that of the sealing ring and designed to cause the sealing ring to enlarge laterally as it contracts upon shrinking at extremely low temperatures.

---

The invention relates generally to seals, seal rings and the like and particularly to those utilizing a resilient material, such as a plastic or rubber, and also particularly with seals designed for use in installations subjected to extremely low temperature.

In recent years considerable difficulty has been experienced in securing and maintaining a seal between adjacent faces by means of a seal ring interposed between the faces where the environment of the ring must function over a wide range of low temperatures, particularly where the parts are subjected to extremely low temperatures. So far as I know, efforts to achieve a satisfactory seal under such varying temperature conditions have not proved successful.

An object of the invention is to provide a novel and improved face seal or seal ring construction particularly designed to function both at ordinary normal or ambient temperatures and through a wide range of low temperatures and particularly at extremely low temperatures.

Another object is to provide a seal or seal ring construction which is so constructed that as it shrinks diametrically upon cooling it automatically compensates for the loss of sealing capability which would otherwise occur by expanding laterally.

A further object is to provide a multiring seal in which the parts are of different coefficients of expansion and so designed that as the sealing ring portion contracts diametrically it is expanded laterally by a wedging action with another part or by the interaction of another part and spring means.

These and other objects will be apparent from the drawing and the following description. Referring to the drawing, which is for illustrative purposes only:

FIG. 1 is a plan view of a composite seal ring embodying the invention;

FIG. 2 is a cross section on line 2—2 of FIG. 1, but on a much larger scale;

FIG. 3 is a sectional view similar to FIG. 2, but showing the ring installed;

FIG. 4 is a fragmentary sectional view on line 4—4 of FIG. 3, but on a smaller scale;

FIG. 5 is a view similar to FIG. 3, but showing an alternate form of the invention;

FIG. 6 is a fragmentary sectional view similar to FIG. 5, but showing a lip-type seal;

FIG. 7 is a view similar to FIG. 3, but showing another form of the invention;

FIG. 8 is a view similar to FIG. 2, but showing a different type of seal ring; and FIG. 9 is a view similar to FIG. 8 showing a modification.

More particularly describing the invention, referring first to the seal ring 11, shown in FIGS. 1–4, this includes a sealing ring 12 which is so termed because it is the portion of the over-all unit which contacts the surfaces against which a seal is to be effected. The ring 12 is preferably made of a resilient nonmetallic material which will not become unduly hard upon being exposed to temperatures in the extremely low range of the cryogenics field. Thus this sealing ring may be made of plastic and "Teflon" (PTFE-fluorocarbon) is preferred. Conceivably other plastics or some types of silicone rubber might be used.

The sealing ring 12 has an internal groove 14 which extends into the body from its inner surface so that in general the ring is of U-shaped cross section with convex lateral sealing surfaces 15. Within the recess or groove 14 I mount a coil spring 16 which is preferably of stainless steel, although other material might be used, and this is of a size to tend to cause the seal ring to maintain the shape in which it is shown in FIG. 2.

The sealing ring 12 is mounted within a metal outer ring 18 which is formed preferably with an inner surface 19 that is convex in cross section and fits a complementary surface 20 formed on the periphery of the sealing ring.

Within the sealing ring 12 I provide a metal inner ring 22 which is preferably made of stainless steel, although some other metal might be used. However, the metal must be one so chosen that the coefficient of expansion thereof is relatively low as compared with the coefficient of expansion of the outer ring 18 which may, for example, be made of aluminum.

At the entrance to the groove or recess 14 of the sealing ring I provide beveled or outwardly flared edges 24 and on the inner ring 22 I provide a wedge-shaped outer surface configuration which embodies the converging surfaces 25. When the ring 11 is assembled with the parts to be sealed, as shown in FIG. 3, the inner ring is partially received in the sealing ring with the surfaces 25 of the inner ring in engagement with the beveled surfaces 24 of the sealing ring. In FIG. 3, numerals 26 and 27 designate the parts between which a seal is to be effected, and 28 designates a seal ring mounting groove in part 27.

In use, if the installation is subjected to extreme cold, the sealing ring 12 shrinks inwardly against the inner ring 22, since it has a much greater coefficient of expansion than the inner ring, and the inner ring then, in effect, wedges the sealing ring laterally outward to maintain sealing engagement thereof with parts 26 and 27 by increasing its width. At the same time the outer ring, whose coefficient of expansion is considerably greater than the inner ring, shrinks inwardly and assists the action by reducing the radial distance between the inner and outer rings.

The peripheral surface portion 29 of the inner ring is preferably concave in cross section to provide clearance for the spring 16, although clearance is not absolutely essential and in some installations there may be contact between the ring and spring, especially as the sealing ring 12 shrinks at low temperatures. Also, the ring 22 may be provided with a series of radial holes 30 to lighten it.

In FIG. 5 I show an alternate form of the invention designated 11A which is generally similar to the ring previously described but differs therefrom in that the outer ring is dispensed with and the periphery of the sealing ring, here designated 12A, is formed with a flat peripheral surface 32. The other parts of the construction are designated by numerals previously used for similar parts but differentiated by the letter A thereafter.

In the form of the invention shown in FIG. 5, the action of the seal ring is generally similar to that previously described for the ring 11 but without the cumulative effect and assistance of an outer ring.

I contemplate that a lip-type seal may be employed in place of those previously described, and, by way of example, in FIG. 6 I show a seal 11B in which the sealing ring, designated 12B is formed to provide a lip end portion 35. This sealing ring can be used in place of either of rings 12 or 12A.

Referring now to FIG. 7, I show another form of seal ring, designated 11C, comprising a sealing ring 12C with a coil spring 16C therein and an inner ring 38 which is shown as T-shaped in cross section. No outer ring is shown, although one may be used, if desired. In this form of the invention, when the ring is installed, the central or main portion 39 of the inner ring bears directly against the coil spring 16C and consequently is made relatively narrow for this purpose. When the assembly is subjected to extremely low temperature conditions, the sealing ring shrinks against or toward the inner ring 38 and this causes the internal coil spring 16C to be expanded laterally and in turn force the sides of the sealing ring 12C outwardly to maintain the seal.

In FIG. 8 I show still another form of the invention, designated 11D, wherein an O-ring type of sealing ring 40 that is substantially circular in cross section is disposed between an inner ring 41 and an outer ring 42. The inner ring has a coefficient of expansion which is less than the outer ring and much less than the material of the sealing ring 40, which may be Teflon, for example. In this form of the invention when the construction is subjected to extreme cold, the sealing ring contracts more than the inner ring in a direction radially inward of the seal as a whole, thereby flattening or widening the ring laterally. At the same time, the outer ring shrinks more than the inner ring, thus reducing the radial distance between the rings.

I contemplate that various-shaped sealing rings can be used, and by way of further example, in FIG. 9 I show a seal ring 11E in which the sealing ring, designated 40A, which was originally rectangular in cross section, as shown by the broken lines, is slightly compressed between an inner ring 41A and an outer ring 42A such as shown in FIG. 8.

Although I have illustrated and described preferred forms of my invention, I contemplate that various changes and modifications can be made therein without departing from the invention, the scope of which is indicated by the following claims.

I claim:

1. A cryogenic face seal, comprising a sealing ring formed of plastic and characterized by being recessed on its inner surface, an annular metal spring within said seal ring in the recess thereof, and an inner ring of metal within said sealing ring and concentric therewith, said inner ring and sealing ring having interengaging cam surfaces, said sealing ring having a relatively high coefficient of expansion relative to said inner ring whereby upon radial contraction of said sealing ring at reduced temperature the same is urged to greater width by said inner ring through the action of said interengaging cam surfaces.

2. The face seal set forth in claim 1 in which an outer ring of metal is concentric with and engages the periphery of said sealing ring and in which the metal of said outer ring has a coefficient of expansion that is substantially higher than the coefficient of expansion of said inner ring.

3. A cryogenic face seal, comprising a sealing ring formed of plastic and having an annular recess facing the opening through the ring, an annular metal coil spring contained in the recess of said sealing ring and bearing against the recess defining walls thereof, and a separate independent inner ring of metal within said sealing ring and concentric therewith, said inner ring being closely adjacent said spring, said sealing ring having a relatively high coefficient of expansion relative to said inner ring whereby upon radial contraction of said sealing ring at reduced temperature the same is urged to greater width by said inner ring through engagement thereof with one of said sealing ring and said spring.

References Cited

UNITED STATES PATENTS

| | | | |
|---|---|---|---|
| 368,189 | 8/1887 | Carter | 277—198 |
| 2,914,350 | 11/1959 | Smith | 277—26 |
| 3,223,426 | 12/1965 | Reid | 277—153 |
| 3,277,797 | 10/1966 | Tyree et al. | 277—26 |
| 3,361,430 | 1/1968 | Reid | 277—26 |

FOREIGN PATENTS

| | | |
|---|---|---|
| 888,138 | 1/1962 | Great Britain. |
| 701,614 | 12/1953 | Great Britain. |

SAMUEL ROTHBERG, Primary Examiner

U.S. Cl. X.R.

277—153, 180